(12) United States Patent
Perkins et al.

(10) Patent No.: US 8,433,473 B2
(45) Date of Patent: Apr. 30, 2013

(54) SYSTEM AND METHOD FOR INDICATING AN EFFICIENCY LEVEL OF ENERGY USAGE BY AN AUTOMOTIVE VEHICLE

(75) Inventors: William Paul Perkins, Dearborn, MI (US); Renata Michaela Arsenault, Plymouth, MI (US); Alan McDonald, West Bloomfield, MI (US); Richard M. Isaacs, Saline, MI (US); Steven A. Daleiden, Milan, MI (US); Allen Dennis Dobryden, Ann Arbor, MI (US); Jimmy H. Kapadia, Ottawa Hills, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 567 days.

(21) Appl. No.: 12/689,017

(22) Filed: Jan. 18, 2010

(65) Prior Publication Data

US 2011/0178670 A1 Jul. 21, 2011

(51) Int. Cl.
*G06F 7/00* (2006.01)

(52) U.S. Cl.
USPC .................. 701/32.8; 701/32.1; 701/33.4

(58) Field of Classification Search ............ 701/36, 701/33.4, 32.8, 32.1, 32.4
See application file for complete search history.

(56) References Cited

U.S. PATENT DOCUMENTS

| | | | |
|---|---|---|---|
| 4,072,047 A | 2/1978 | Reismüller | |
| 4,292,840 A | 10/1981 | Nguyen | |
| 5,713,654 A | 2/1998 | Scifres | |
| 5,949,346 A | 9/1999 | Suzuki et al. | |
| 6,517,226 B1 | 2/2003 | Zimmermann | |
| 6,536,928 B1 | 3/2003 | Hein et al. | |
| 6,935,763 B2 | 8/2005 | Mueller et al. | |
| 2002/0152045 A1 | 10/2002 | Dowling et al. | |
| 2007/0276582 A1 | 11/2007 | Coughlin | |
| 2008/0112175 A1 | 5/2008 | Bucher | |
| 2008/0258891 A1 | 10/2008 | Sato | |
| 2009/0043467 A1 | 2/2009 | Filev et al. | |

FOREIGN PATENT DOCUMENTS

| | | |
|---|---|---|
| DE | 102006009636 A1 | 9/2007 |
| EP | 0083000 A3 | 7/1983 |
| EP | 1074431 A3 | 2/2001 |
| KR | 20030088916 A | 11/2003 |
| WO | 0136870 A1 | 5/2001 |
| WO | 0245467 A2 | 6/2002 |
| WO | 2006079475 A1 | 8/2006 |

OTHER PUBLICATIONS

Costlow, Terry, Light From The Darkness, Automotive Engineering International Magazine, May 2008, pp. 24-27.
http://jalopnik.com/5094111/2010-honda-insight-ecological-drive-assist-s, Nov. 20, 2008, pp. 1-3.

*Primary Examiner* — Richard M. Camby
(74) *Attorney, Agent, or Firm* — Vichit Chea; Brooks Kushman P.C.

(57) ABSTRACT

A system and method is provided for indicating an efficiency level of energy usage by an automotive vehicle to a passenger in the vehicle. The system includes a computer-readable storage medium, a controller, an interior-lighting system, and a display unit. The controller processes energy usage signals to obtain the given operating mode of the vehicle as well as indications of energy usage amounts that the passenger can control. The controller determines the efficiency level of energy usage by the vehicle based on the energy usage amounts and the given operating mode. The interior-lighting system illuminates at least a portion of the passenger compartment with ambient light having defined characteristics including a luminance and a color, the ambient light indicating the efficiency level. The display unit displays a graphical representation of the efficiency level.

20 Claims, 4 Drawing Sheets

SYSTEM AND METHOD FOR INDICATING AN EFFICIENCY LEVEL OF ENERGY USAGE BY AN AUTOMOTIVE VEHICLE

BACKGROUND

1. Technical Field

System and method for indicating an efficiency level of energy usage by an automotive vehicle to a passenger in the vehicle.

2. Background Art

The need to reduce energy usage of a vehicle is well known. Reducing the energy usage of the vehicle can improve engine fuel economy of the vehicle as well as extend the life of a storage battery in a battery-powered vehicle, such as a high-voltage battery that outputs electric energy. Furthermore, reducing the energy usage of the vehicle can reduce undesirable emissions from the vehicle.

SUMMARY

A system and method is provided for indicating an efficiency level of energy usage by an automotive vehicle to a passenger in the vehicle. The system includes a computer-readable storage medium, a controller in communication with the storage medium, as well as an interior-lighting system and display unit in electrical communication with the controller.

The controller receives a plurality of energy usage signals and processes the energy usage signals to obtain indications of energy usage amounts. The indications of energy usage amounts can be controlled by a passenger in the vehicle while maintaining a given operating mode of the vehicle. The energy usage amounts may represent at least one of energy used to accelerate the automotive vehicle, energy used to maintain a speed of the automotive vehicle, energy used to provide air conditioning in the automotive vehicle, energy used to supply accessory loads in the automotive vehicle, and electric energy generated from decelerating the automotive vehicle.

Based on the energy usage amounts for the given operating mode of the vehicle, the controller determines the efficiency level of energy usage by the vehicle. The efficiency level may represent a relationship of minimal amount of energy usage needed to establish the given operating mode and the energy usage amounts expended to establish the given operating mode.

The controller may process the energy usage amounts to obtain a normalized amount that represents a sum of the energy usage amounts relating to the given operating mode of the automotive vehicle. Based on a comparison between the normalized amount and a predetermined extremum, the controller obtains the efficiency level.

The controller may control one or more operations in the automotive vehicle to change at least one of the energy usage amounts while maintaining the given operating mode of the automotive vehicle.

The interior-lighting system illuminates at least a portion of the passenger compartment with ambient light. The ambient light has defined characteristics including a luminance and a color. At least one of the characteristics of the ambient light indicates the efficiency level. At least one of the characteristics of the ambient light may allow the passenger to be informed of the efficiency level as the passenger focuses on controlling the automotive vehicle from one location to another. The interior-lighting system may include a door light, a ceiling light, a foot-well light, an instrument panel light, a beverage-holder light, a knob light, a button light, or a trim light.

The controller may control at least one of the luminance and the color of the ambient light based on the efficiency level. The controller may change the color of the ambient light from a color representing conservative energy usage to a color representing aggressive energy usage when the controller determines that the efficiency level is below a predetermined level of efficiency. The controller may change at least one of the luminance and the color of the ambient light based on one of the energy usage amounts representing energy used to either accelerate the vehicle, maintain a speed of the vehicle, provide air conditioning in the vehicle, or a combination thereof. Furthermore, the controller may change at least one of the luminance and the color of the ambient light based on one of the energy usage amounts representing electric energy generated from decelerating the automotive vehicle.

The display unit displays a graphical representation of the efficiency level of the vehicle. The display unit may display a graphical representation of at least one of the energy usage amounts relative to a graphical measure to display the graphical representation of the efficiency level. The graphical measure may indicate the predetermined extremum.

In addition, the display unit may allow the passenger to view the graphical representation once the passenger has been informed of the efficiency level indicated by at least one of the characteristics of the ambient light.

The method includes processing a plurality of energy usage signals to obtain indications of energy usage amounts. Each of the energy usage amounts represent an amount of energy that the passenger can control while maintaining a given operating mode of an automotive vehicle. Based on the energy usage amounts for the given operating mode of the vehicle, the efficiency level of energy usage by the vehicle is determined. The method also includes illuminating at least a portion of a vehicle passenger compartment with ambient light and displaying a graphical representation of the efficiency level of the vehicle. The ambient light has defined characteristics including a luminance and a color. At least one of the characteristics of the ambient light indicates the efficiency level. For example, the method may include controlling at least one of the luminance and the color of the ambient light based on the efficiency level.

The method may include displaying a graphical representation of at least one of the energy usage amounts relative to a graphical measure to display the graphical representation of the efficiency level. Changing the one energy usage amount changes the graphical representation of the energy usage amount relative to the graphical measure. In addition, the method may include processing the energy usage amounts to obtain a normalized amount and comparing the normalized amount to a predetermined extremum to obtain the efficiency level. The normalized amount represents a sum of the energy usage amounts relating to the given operating mode of the automotive vehicle.

DETAILED DESCRIPTION

Embodiments of the present invention generally provide a system and method for indicating an efficiency level of energy usage by an automotive vehicle to a passenger in the vehicle. When the vehicle is using energy, the passenger in the vehicle may desire or need a real-time indication of how efficient the vehicle is using energy based on an operating mode of the vehicle. Ambient light and at least one graphical representation are used to indicate the efficiency level to the passenger.

Figure 1:
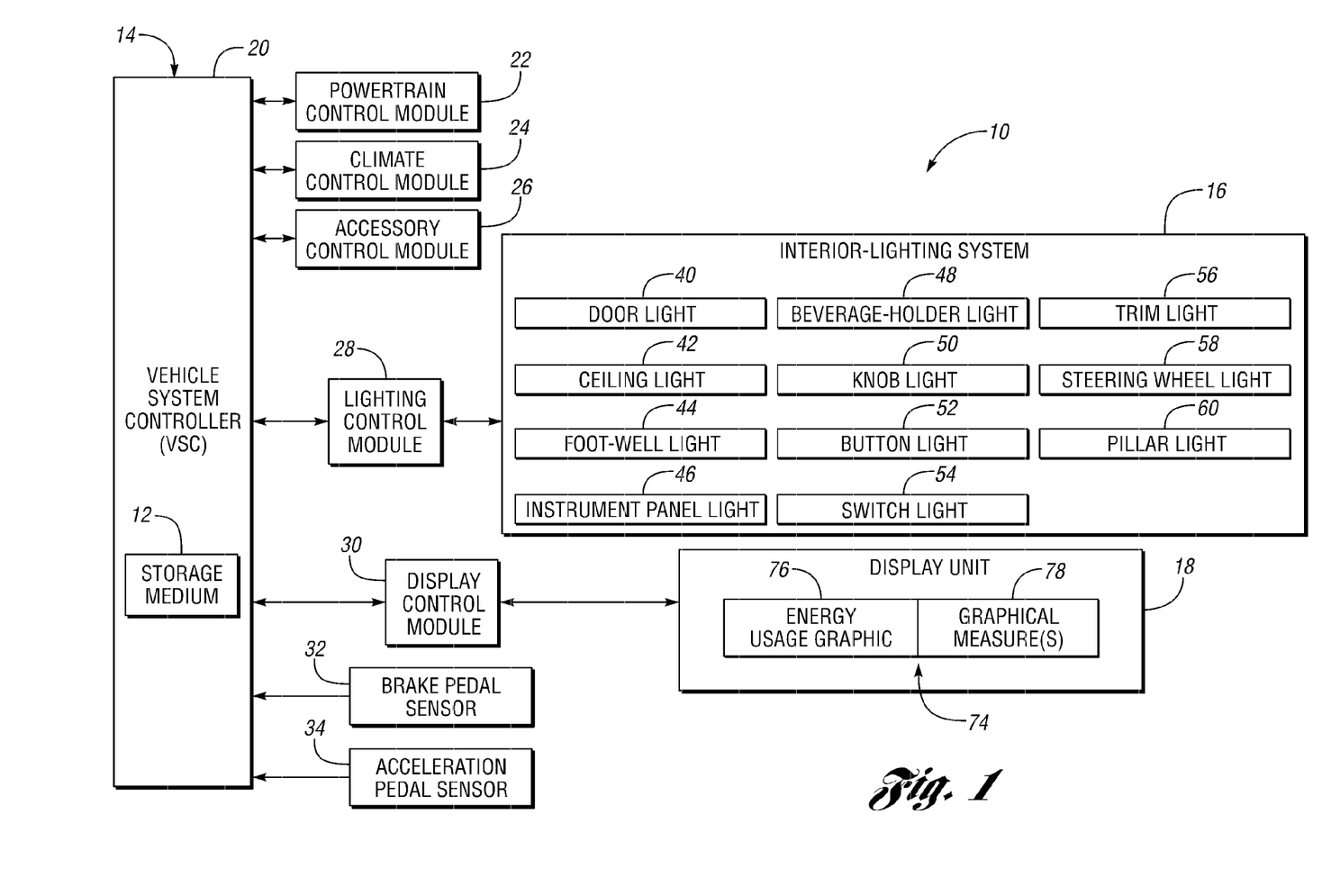
FIG. 1 is a schematic diagram illustrating a system for indicating an efficiency level of energy usage by an automotive vehicle, the system including an interior-lighting system, a display unit, and a controller for determining the efficiency level.

With reference to FIG. 1, a system 10 is provided for indicating an efficiency level of energy usage by an automotive vehicle. The system 10 includes a computer-readable storage medium 12 (hereinafter "memory"), a controller 14 or some other type of programmable logic device, an interior-lighting system 16, and a display unit 18. The system 10 and its method of operation are described in an integrated manner to facilitate understanding of various aspects of the present invention.

With continuing reference to FIG. 1, the memory 12 stores data or information that the system 10 uses for indicating the efficiency level. For example, the memory 12 may store a computer program or algorithm embedded or encoded with the method. The controller 14 is in communication with the storage medium 12 to access the data or information stored in memory 12. The memory 12 can be part of the controller 14 as shown in FIG. 1. However, the memory 12 may be positioned in any suitable portion of the system 10 accessible to the controller 14. In addition to storing a computer program or algorithm, the memory 12 of the system 10 may store data or information about the various components in the vehicle to implement the method.

As illustrated in FIG. 1, the controller 14 is generally shown as a vehicle system controller 20 (hereinafter "VSC"). However, the controller 14 may be a controller that is separate from the VSC 20. Furthermore, although the controller 14 is shown as a single hardware device, the controller 14 may include multiple controllers in the form of multiple hardware devices, or multiple software controllers within one or more hardware devices. For example, the controller 14 may include the VSC 20, a powertrain control module (PCM) 22, a climate control module 24, an accessory control module 26, a lighting control module 28, a display control module 30, or a combination thereof depending on the configuration of the system 10.

As shown in FIG. 1, the controller 14 is configured to receive a plurality of energy usage signals. The energy usage signals are embedded or encoded with data or information that indicates energy that the vehicle has used or will be using soon, such as within 200 milliseconds of obtaining the energy usage signals. The controller 14 can receive the energy usage signals internally from within the controller 14, externally from one or more components in the vehicle, or both internally or externally depending on the configuration of the system 10. For example, the VSC 20, the PCM 22, the climate control module 24, the accessory control module 26, the lighting control module 28, the display control module 30, a brake pedal sensor 32, an acceleration pedal sensor 34, or a combination thereof may provide the energy usage signals to the controller 14. For example, the acceleration pedal sensor 34 may provide data or information relating to energy used to accelerate the vehicle. Similarly, the PCM 22 may provide data or information relating to powertrain output power, fuel consumption of the vehicle, battery power consumption, or a combination thereof.

The controller 14 processes the energy usage signals to obtain indications of energy usage amounts. The controller 14 may obtain the indications of energy usage amounts periodically, such as every 50 milliseconds to 60 seconds, depending on the configuration of the system 10. At least some of the energy usage amounts represent energy that the passenger in the vehicle can control or influence while maintaining a given operating mode of the vehicle and, therefore may be referred to as "active" energy amounts. Other energy usage amounts may indicate energy that a driver of the vehicle cannot either directly and immediately control or be expected to directly control while driving the vehicle from one location to another and, therefore, may be referred to as "passive" energy amounts. The indications of energy usage amounts may indicate how much fuel or electric energy that the vehicle has used or will be using within the next 200 milliseconds. In addition, the controller 14 may control one or more operations in the vehicle to change at least one of the active energy amounts while maintaining the given operating mode of the vehicle, which is based on "passive" energy usage.

"Passive" energy usage determines the given operating mode of the vehicle, while "active" energy usage relates to energy usage that the passenger can control during the given operating mode of the vehicle. The controller 14 may determine the given operating mode of the vehicle based on passive energy usage. Since the controller 14 may determine the given operating mode of the vehicle based on passive energy usage, the given operating mode is be based on one or more signals having various information or data, such as tire-pressure information, powertrain operating temperature information, PRNDL position information (i.e., gear shift selection information for park, reverse, neutral, drive, low-drive), terrain information, grade information, environmental information, other operative mode information of the vehicle, or a combination thereof. Increased passive energy usage reduces the energy usage efficiency of the vehicle while decreased passive energy usage increases the energy usage efficiency.

A driver may not be able to control a tire pressure in the vehicle during driving. Therefore, tire pressure influences the passive energy usage of the vehicle and, therefore, the given operating mode of the vehicle. The controller 14 may determine the given operating mode of the vehicle as in a decreased efficiency mode when tire-pressure information indicates a low tire pressure in at least one of the tires of the vehicle. Low tire pressure can increase the rolling resistance of the vehicle and, therefore, can increase the passive energy usage by the vehicle as well as change the given operating mode of the vehicle.

The controller 14 may determine the given operating mode of the vehicle based on powertrain operating temperature information. Powertrain operating temperature information indicates that at least one of the powertrain components, such as an engine or motor in the vehicle, is operating outside a suitable temperature range. Sub-optimal operating temperature of the powertrain increases parasitic drag (e.g., viscous oil drag, seal drag, etc.). Increased parasitic drag increases the passive energy usage of the vehicle since a driver is not expected to directly control an operating temperature of the powertrain to increase the energy usage efficiency of the vehicle during operation of the vehicle. Thus, a powertrain operating temperature can change the given operating mode of the vehicle.

The given operating mode of the vehicle may be based on PRNDL position information. The controller 14 may determine the given operating mode of the vehicle based on the gear shift selection, such as whether the vehicle is in park, reverse, neutral, drive, low-drive. Gear shift selection is considered a passive energy usage factor since a driver is not expected to shift gears to increase the energy usage efficiency of the vehicle during operation of the vehicle.

Furthermore, the controller 14 may determine the given operating mode of the vehicle based on terrain, grade, and/or environmental information. The controller 14 may receive such information from any number of suitable devices or controllers in communication with the system 10. For example, the accessory control module 26 in communication with a positioning-based system or navigation system may provide the terrain, grade, and environmental information to the system 10.

Terrain information indicates the type of terrain or driving surface that the vehicle is operating on. Terrain information may include whether the vehicle is on a paved road, dirt road, or other type of road surface. A vehicle typically uses less energy driving on a smooth driving surface compared to an irregular or bumpy driving surface. Terrain information may be a passive energy usage factor, depending on the situation, since a driver may not be expected to change the terrain that the vehicle is driven on.

Grade information indicates the incline or grade of the driving surface. For example, the grade information may indicate that the vehicle is on a hill or operating up/down a relatively steep incline/decline. Uphill grades require more power from the vehicle to accelerate the vehicle. Likewise, maintaining the speed of a vehicle driving uphill requires more energy than maintaining the speed of the vehicle driving slightly downhill. Furthermore, the additional energy used to drive the vehicle up an incline may not be fully regained on a downhill grade, which reduces the overall energy usage efficiency of the vehicle. Like the terrain information, grade information may be a factor of passive energy usage.

Environmental information indicates a condition of the driving surface of the vehicle. For example, environmental information may include weather-based information that the vehicle is being exposed to. For example, the weather-based information may indicate whether the driving surface is wet, dry, slippery, hot, cold, etc. The condition of the driving surface influences the passive energy usage of the vehicle. For example, poor road conditions may increase rolling resistance of the vehicle and, therefore, decrease the energy usage efficiency of the vehicle. In addition, driving in extreme cold or hot climates can reduce the optimal energy usage efficiency of the vehicle. For example, an extremely cold battery may be less efficient at providing energy than a battery at room temperature. Since the driver of the vehicle may not be expected to change the environment that the vehicle is exposed to, environmental information may be considered a factor of passive energy usage that determines the given operating mode of the vehicle.

The controller 14 may determine or update the operating mode of the vehicle periodically, such as every 50-200 milliseconds during vehicle operation depending on the configuration of the system 10. Periodically updating the operating mode of the vehicle can provide the system 10 with updated information for indicating the efficiency level of energy usage as the vehicle is operated. For example, the system 10 may update the operating mode of the vehicle every 50 milliseconds or less to provide a real-time indication of the efficiency level.

The controller 14 may process the energy usage amounts to obtain a normalized amount. The normalized amount represents a sum of the energy usage amounts relating to the given operating mode of the vehicle. For example, the controller 14 may sum the "active" energy amounts to obtain the normalized amount.

One of the indications of energy usage amounts may represent energy used to accelerate the vehicle. Energy used to accelerate the vehicle can be considered an active energy amount since the passenger in the vehicle can control energy used to accelerate the vehicle. As the vehicle experiences greater acceleration, the vehicle uses more energy. Thus, the vehicle becomes less energy efficient at a high acceleration (e.g., 0 to 60 mph in 6 seconds) than a lower acceleration (e.g., 0 to 60 mph in 15 seconds). The controller 14 may determine the energy used to accelerate the vehicle based on accelerator pedal position, powertrain output power, fuel consumption of the vehicle, battery power consumption, or a combination thereof.

Another one of the energy usage amounts may represent energy used to maintain a speed of the vehicle. Energy used to maintain a speed of the vehicle can be considered an active energy amount since the passenger in the vehicle can control the energy used to propel the vehicle. As the vehicle experiences a greater speed, the vehicle requires more energy to maintain the speed of the vehicle. Therefore, the vehicle becomes less energy efficient when maintaining a high speed (e.g., 70 miles per hour (mph)) than a lower speed (e.g., 35 mph). The controller 14 may determine the energy used to maintain the speed of the vehicle based on powertrain output power, fuel consumption of the vehicle, battery power consumption, aerodynamic drag of the vehicle, or a combination thereof. For example, the controller 14 may determine the aerodynamic drag of the vehicle in proportion to the vehicle speed squared.

At least one of the energy usage amounts may represent energy used to provide air conditioning in the vehicle. Air conditioning in the vehicle can include heating, cooling, or selectively heating and cooling the air in the passenger compartment. In addition, air conditioning in the vehicle may include ventilating, filtering, or other modification to the air in the vehicle. Energy used to provide air conditioning in the vehicle can be considered an active energy amount since the passenger in the vehicle can control the energy used to condition the air in the vehicle. As the vehicle provides greater air conditioning, the vehicle uses more energy. Providing air conditioning at a greater rate may be more or less energy efficient depending on the air conditioning system in the vehicle. For example, a climate control setting at a maximum level may consume more energy and be less energy efficient than an intermediate climate control setting. The controller 14 may determine the energy used to provide air conditioning in the vehicle based on battery power consumption or energy usage information from the climate control module 24, the accessory control module 26, or both modules 24, 26.

One or more of the energy usage amounts may represent energy used to supply accessory loads in the vehicle. For example, accessory loads may include an entertainment system, a navigation system, a plug-in outlet load, an information system, a radio, a seat heater, an audio system, an audio/video system, and other energy using systems in the vehicle. Energy used to supply accessory loads in the vehicle can be considered an active energy amount since the passenger in the vehicle can control the energy used to supply the accessory loads in the vehicle. The controller 14 may determine the energy used to supply accessory loads in the vehicle based on battery power consumption or energy usage information from the accessory control module 26.

Another one of the energy usage amounts may represent electric energy generated from decelerating the vehicle. For example, energy generated from decelerating the vehicle may be obtained during regenerative braking of the vehicle where kinetic energy of the vehicle is converted into electric energy during braking of the vehicle. Electric energy generated from decelerating the vehicle can be considered an active energy amount since the passenger in the vehicle can control brakeage or the rate of braking the vehicle. The controller 14 may determine the energy generated from decelerating the vehicle based on data or information from the powertrain control module 22, the brake pedal sensor 32, or both modules 22, 32.

Based on the energy usage amounts obtained and the given operating mode of the vehicle, the controller 14 determines the efficiency level of energy usage by the vehicle. The controller 14 may determine the efficiency level based on a minimal amount of energy usage needed to establish the given operating mode and the energy usage amounts that have been expended to establish the given operating mode. For example, if the minimal amount of energy usage needed to operate the vehicle in park is 70 energy units and the amount of energy being used to operate the vehicle in park is 100 energy units, then the efficiency level is 70%. Similarly, if the minimal amount of energy usage needed to operate the vehicle at a 65 mph is 90 energy units and the amount of energy being used to operate the vehicle at the 65 mph is 100 energy units, then the efficiency level is 90%.

The controller 14 may compare the normalized amount to a predetermined extremum to obtain the efficiency level of energy usage. The predetermined extremum may be either a maximum or a minimum level of energy that can be used to achieve the given operating mode of the vehicle. The maximum or the minimum level of energy can be used as a reference for the normalized amount to obtain the efficiency level depending on the configuration of the system 10. For example, if the normalized amount is 150 units of energy during the given operating mode and only 100 units of energy (i.e., the minimum level of energy) is needed to operate the vehicle at the given operating mode, then the controller 14 can determine that the efficiency level of the vehicle is at a reduced efficiency level (e.g., 50%) since more energy is being used than needed. In another example, if the normalized amount is 99 units of energy during the given operating mode and the vehicle could use 100 units of energy (i.e., the maximum level of energy) to operate the vehicle at the given operating mode, then the controller 14 can determine that the efficiency level of the vehicle is at a reduced efficiency level since the amount being used (i.e., 99 units of energy) is within a predetermined range (e.g., 10 energy units) from the maximum level of energy (i.e., 100 units of energy) that could be used while maintaining the given operating mode.

The controller 14 may access the maximum and the minimum level of energy from the memory 12. Alternatively, the controller 14 may either calculate the extremum from an equation stored in the memory 12 or lookup the extremum from a lookup table stored in the memory 12. In addition, the controller 14 may categorize or group each of the energy usage amounts into a set of energy usage amounts for the display unit 18 to graphically display.

As illustrated in FIG. 1, the interior-lighting system 16 is in electrical communication with the controller 14. FIG. 1 shows the lighting control module 28 electrically connecting the controller 14 and the interior-lighting system 16. However, the controller 14 may be connected directly to the interior-lighting system 16 and include the functionality of the lighting control module 28 to control the interior-lighting system 16.

Figure 2:
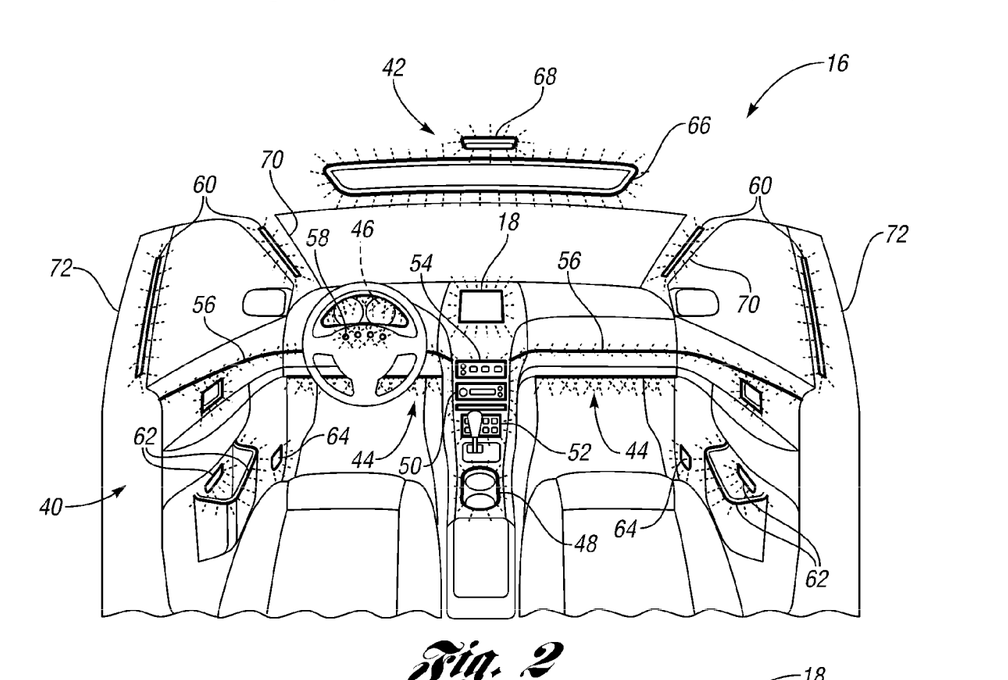
FIG. 2 is a diagrammatical perspective view illustrating a passenger compartment of the vehicle with the display unit and at least part of the interior-lighting system.

Referring to FIG. 2, the interior-lighting system 16 in the vehicle may include a door light 40, a ceiling light 42, a foot-well light 44, an instrument panel light 46, a beverage-holder light 48, a knob light 50, a button light 52, a switch light 54, a trim light 56, a steering wheel light 58, a pillar light 60, or a combination thereof. The door light 40 may include a map pocket light 62, a scuff panel light 64, or other light on the door of the vehicle. The ceiling light 42 may include a moon roof light 66, a dome light 68, or any other lights on the ceiling of the vehicle. The trim light 56 can include an accent light or a dash-trim light in the vehicle. The pillar light 60 may include a light on an A-pillar 70, B-pillar 72, C-pillar (not shown), or a combination thereof. Furthermore, the lights of the interior-lighting system 16 may provide backlighting to a number of components that are viewable from the passenger compartment.

In operation, the interior-lighting system 16 illuminates at least a portion of the passenger compartment with ambient light. FIG. 2 illustrates the ambient light emanating from the interior-lighting system 16 with defined characteristics including a luminance and a color. For example, the luminance may be between 0.001 and 300,000 $cd/m^2$. The color may be red, orange, yellow, green, blue, violet, or any other color or combination of colors that can be derived from the visible light spectrum.

At least one of the characteristics of the ambient light of the interior-lighting system 16 indicates the efficiency level. More specifically, the luminance of the ambient light, the color of the ambient light, or both can be used to indicate the efficiency level of energy usage by the vehicle. In addition, the ambient light may be pulsated or varied according a predetermined pattern stored in memory 12 to indicate the efficiency level to one or more passengers in the vehicle.

Referring again to FIG. 2, the controller 14 can control at least one of the luminance and the color of the ambient light based on the efficiency level. For example, the controller 14 may change the color of the ambient light from a color representing conservative energy usage to a color representing aggressive energy usage when the controller 14 determines that the efficiency level is below a predetermined level of efficiency. In such an example, the color representing conservative energy usage may be green while the color representing aggressive energy may be red. Furthermore, the controller 14 may change the ambient light from green to red when the efficiency level is below an efficiency threshold or the predetermined level of efficiency, such as 95%. Alternatively, the controller 14 may gradually change the color of the ambient light as the efficiency level changes. Thus, a passenger in the vehicle may view the color of the ambient light as changing discretely or continuously from one color to another color depending on the configuration of the system 10. For example, the color may change continuously along a predetermined gradation of color.

The controller 14 may change the luminance of the ambient light from a low intensity representing conservative energy usage to a higher intensity representing aggressive energy usage when the controller 14 determines that the efficiency level is below a predetermined level of efficiency. In such an example, the luminance representing conservative energy usage may be dim while the color representing aggressive energy may be bright. Furthermore, the controller 14 may change the luminance of the ambient light from dim to bright when the efficiency level is below an efficiency threshold or the predetermined level of efficiency. Alternatively, the controller 14 may gradually change the luminance of the ambient light as the efficiency level changes. Thus, a passenger in the vehicle may view the luminance of the ambient light as changing discretely or continuously from one intensity to another intensity depending on the configuration of the system 10. For example, the luminance may change continuously along a predetermined gradation of luminance.

The controller 14 may change at least one of the luminance and the color of the ambient light based on one or more of the energy usage amounts. The energy usage amounts may represent energy used to accelerate the vehicle, energy used to maintain a speed of the vehicle, energy used to provide air conditioning in the vehicle, electric energy generated from decelerating the vehicle, or other active energy amount that the passenger in the vehicle can control while maintaining a given operating mode of the vehicle.

The ambient light from the interior-lighting system 16 allows the passenger in the vehicle to be informed of the efficiency level during operation of the vehicle. More specifically, the interior-lighting system 16 can allow the passenger to focus on driving or controlling the vehicle from one location to another while having a peripheral view of the ambient light and, therefore, the efficiency level of energy usage by the vehicle.

Referring again to FIG. 1, the display unit 18 is in electrical communication with the controller 14. FIG. 1 shows the display control module 30 electrically connecting the controller 14 and the display unit 18. However, the controller 14 may be connected directly to the display unit 18 and include the functionality of the display control module 30 to control the display unit 18.

Figure 3:
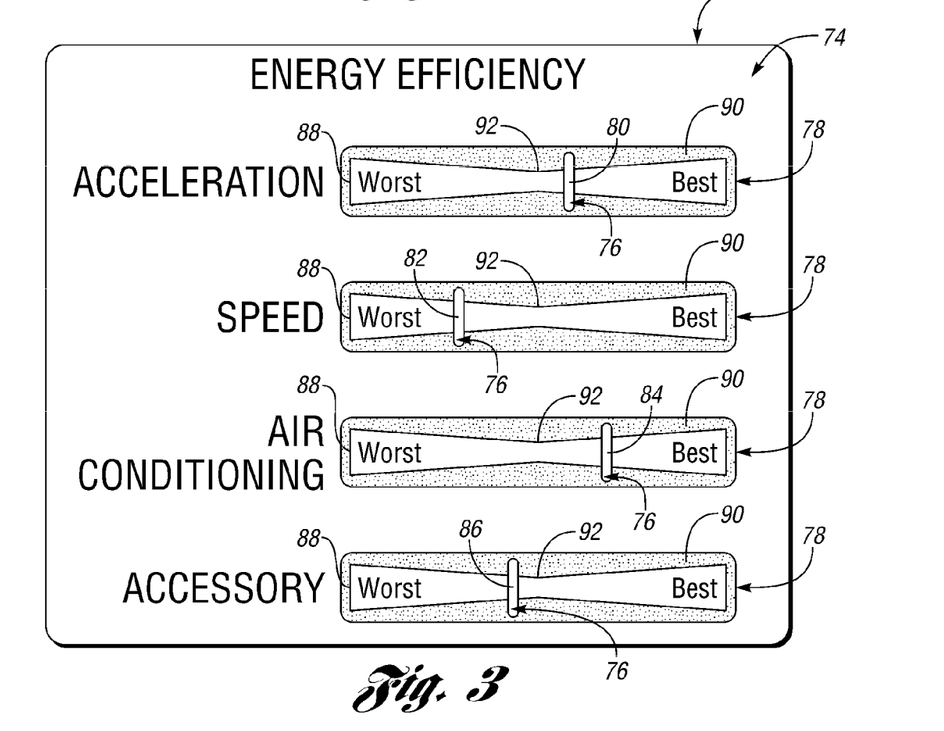
FIG. 3 is a schematic diagram illustrating the display unit of the system with at least one graphical representation of the efficiency level.

With reference to FIG. 3, the display unit 18 displays one or more graphical representations 74 of the efficiency level for the passenger in the vehicle. The display unit 18 can allow the passenger in the vehicle to view the graphical representations 74 once the passenger has been notified of, alerted of, understood, or otherwise informed of the efficiency level based on the ambient light from the interior-lighting system 16.

As depicted in FIG. 3, the display unit 18 may display the graphical representations 74 of the efficiency level as combination of an energy usage graphic 76 and a graphical measure 78. The energy usage graphic 76 is a graphical representation of at least one of the energy usage amounts. When displayed, the relative position between the graphic 76 and the graphical measure 78 indicates the efficiency level to inform the passenger of the efficiency level.

FIG. 3 illustrates four different types of the energy usage graphic 76: an acceleration energy-usage graphic 80, a speed energy-usage graphic 82, an air-conditioning energy-usage graphic 84, and an accessory-load energy-usage graphic 86.

Each of the graphical measures 78 of FIG. 3 is shown as a sliding scale 88 ranging from one end labeled "WORST" and an opposing end labeled "BEST". The sliding scale 88 may or may not have text depending on the configuration of the display unit 18. The graphical measure 78 can be any type of graphical reference that can be viewed relative to the energy usage graphic 76 to display the graphical representations 74 of the efficiency level.

The graphical measure 78 may indicate the predetermined extremum to display the graphical representations 74 of the efficiency level. More specifically, the end labeled "WORST" of the sliding scale 88 may indicate the predetermined extremum as the minimum level of energy that can be used a device in the vehicle, such as the air conditioning system, while maintaining the given operating mode of the vehicle. Thus, the display unit 18 may allow the passenger in the vehicle to view the graphical representations 74 of the efficiency level to show the passenger what energy usage amounts can be changed to reduce the normalized amount while maintaining the given operating mode of the vehicle.

With continuing reference to FIG. 3, at least one light source 90, which may be part of the interior-lighting system 16, may illuminate or backlight an illuminated portion 90 of the graphical measure 78 in the display unit 18. The illuminated portion 90 of FIG. 3 may include the end labeled "WORST", the opposing end labeled "BEST", and an intermediate portion 92 of the graphical measure 78 generally between the ends labeled "WORST" and "BEST". The illuminated portion 90 of FIG. 3 tappers inwardly from the end labeled "WORST" toward the intermediate portion 92 of the graphical measure 78. Similarly, the illuminated portion 90 tappers inwardly from the opposing end labeled "BEST" toward the intermediate portion 92 of the graphical measure 78.

Figure 4:
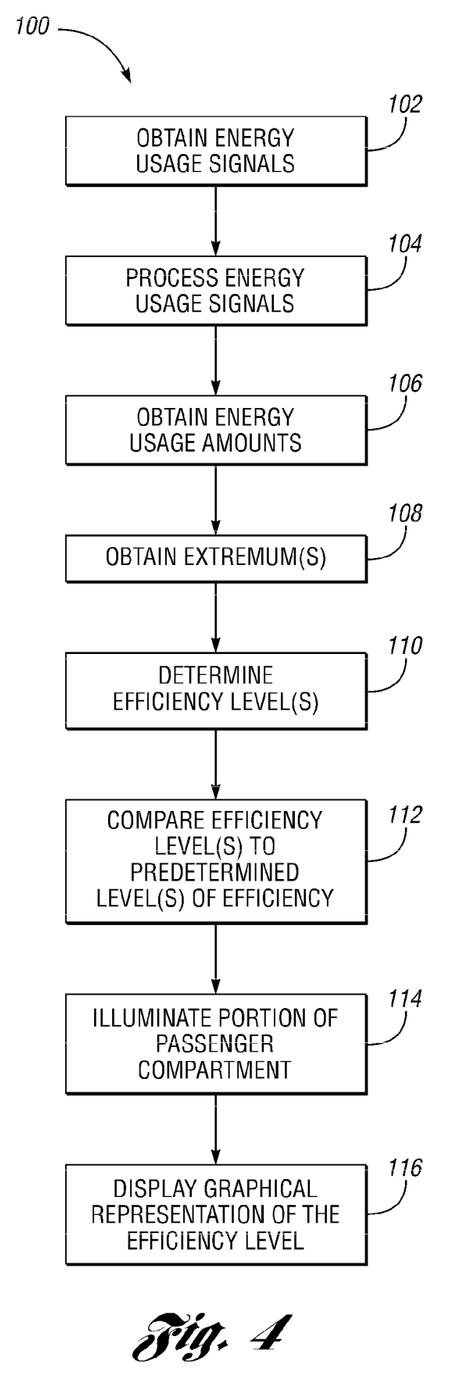
FIG. 4 is a flowchart diagram illustrating a method of indicating the efficiency level.

With reference to FIG. 4, flowchart diagram 100 illustrates steps of a method of indicating an efficiency level of energy usage by an automotive vehicle. In addition to the steps shown in FIG. 4, the programmable logic device, such as the controller 14, may be programmed with additional steps to provide additional functionality.

Referring to FIG. 4, the system 10 and its components illustrated in FIGS. 1-3 are referenced throughout the discussion of the method of indicating the efficiency level of energy usage as well as other methods to facilitate understanding of various aspects of the present invention. The method of indicating the efficiency level may implemented through a computer algorithm, machine executable code, or a software program programmed into a suitable programmable logic device (s) of the vehicle, such as the controller 14, the VSC 20, the PCM 22, the climate control module 24, the accessory control module 26, the lighting control module 28, the display control module 30, or a combination thereof.

At step 102 of flowchart diagram 100, energy usage signals are obtained. The controller 14 can obtain the energy usage signals from any suitable component or combination of components in the vehicle. For example, the controller 14 may receive the energy usage signals internally or from the VSC 20, the PCM 22, the climate control module 24, the accessory control module 26, the lighting control module 28, the display control module 30, the brake pedal sensor 32, the acceleration pedal sensor 34, or a combination thereof.

At step 104, energy usage signals are processed. The controller 14 can process the energy usage signals in real-time or on a periodic basis, such as every 50 milliseconds, to provide a timely indication of the efficiency level of energy usage. The controller 14 may process the energy usage amounts to obtain a normalized amount representing a sum of the energy usage amounts relating to the given operating mode of the vehicle.

At step 106, at least one energy usage amount is obtained. The controller 14 can obtain the energy usage amounts from the VSC 20, the PCM 22, the climate control module 24, the accessory control module 26, the lighting control module 28, the display control module 30, or from the controller 14 performing step 104.

At step 108 of flowchart diagram 100, at least one extremum is obtained. The controller 14 can either calculate or lookup the extremum based on either the maximum amount of energy that can be used during the given operating condition or the minimum amount of energy needed to maintain the given operating condition.

At step 110, at least one efficiency level is determined. Based on the energy usage amounts obtained in step 106 and the given operating mode of the vehicle, the controller 14 can determine the efficiency level of energy usage by the vehicle. For example, the efficiency level may be determined based on a minimal amount of energy usage needed to establish the given operating mode and the energy usage amounts that have been expended to establish the given operating mode.

At step 112, the efficiency level determined in step 110 is compared to a predetermined level of efficiency. The controller 14 can obtain the predetermined level of efficiency from memory 12 or calculate the predetermined level of efficiency based on the given operating mode of the vehicle.

At step 114, at least a portion of a passenger compartment is illuminated. The interior-lighting system 16 can illuminate at least a portion of the passenger compartment with ambient light. The ambient light has defined characteristics including a luminance and a color. At least one of the characteristics of the ambient light indicates the efficiency level. The luminance, the color, or both the luminance and the color of the ambient light may indicate the efficiency level.

At step 116, a graphical representation of the efficiency level is displayed. The display unit 18 can display one or more graphical representations 78 of the efficiency level for the passenger in the vehicle.

Although the various steps in the flowchart diagram 100 are shown sequentially, in actual practice, some or all of these steps may be performed in a different order, including concurrently. Moreover, it is contemplated that the method can be performed repeatedly to account for various conditions of the vehicle.

Figure 5:
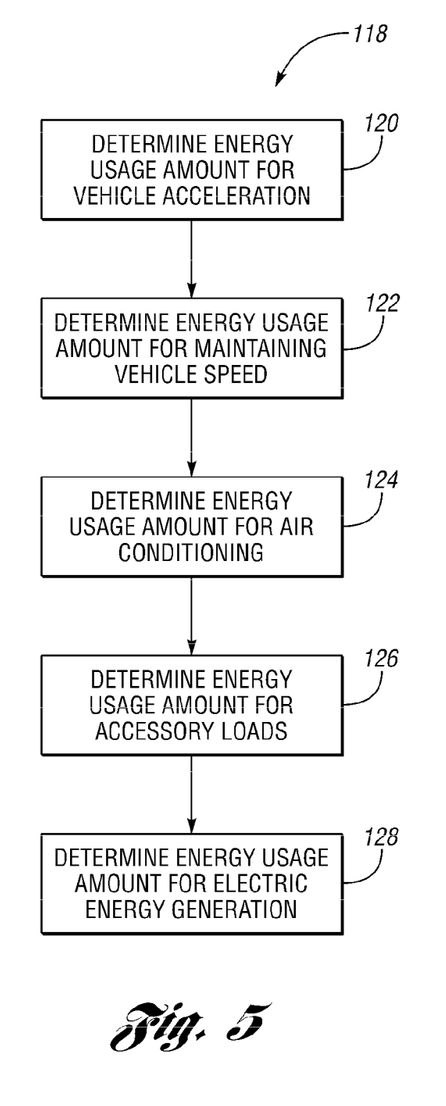
FIG. 5 is a flowchart diagram illustrating a method of obtaining energy usage amounts.

With reference to FIG. 5, flowchart diagram 118 illustrates steps of a method of obtaining energy usage amounts. The method of obtaining energy usage amounts may be used in step 106 of flowchart diagram 100. The controller 14 can obtain each of the energy usage amounts periodically, such as every 50 milliseconds to 60 seconds, depending on the configuration of the system 10.

At step 120 of flowchart diagram 118, an energy usage amount for vehicle acceleration is determined. The controller 14 may determine the energy used to accelerate the vehicle based on accelerator pedal position, powertrain output power, fuel consumption of the vehicle, battery power consumption, or a combination thereof. For example, the controller 14 may receive data or information relating to the energy used to accelerate the vehicle from the acceleration pedal sensor 34 to determine the energy used to accelerate the vehicle.

At step 122, an energy usage amount for maintaining vehicle speed is determined. The controller 14 may determine the energy used to maintain the speed of the vehicle based on powertrain output power, fuel consumption of the vehicle, battery power consumption, aerodynamic drag of the vehicle, or a combination thereof. For example, the controller 14 may calculate the aerodynamic drag of the vehicle in proportion to the vehicle speed squared.

At step 124, an energy usage amount for air conditioning is determined. The controller 14 may determine the energy used to provide air conditioning in the vehicle based on battery power consumption or energy usage information from the climate control module 24 and/or the accessory control module 26.

At step 126, an energy usage amount for accessory loads is determined. The controller 14 can determine the energy used to supply accessory loads in the vehicle based on battery power consumption or energy usage information from the accessory control module 26.

At step 128 of flowchart diagram 118, an energy usage amount for electric energy generation is determined. The controller 14 may determine the energy generated from decelerating the vehicle based on data or information from the powertrain control module 22, the brake pedal sensor 32, or both modules 22, 32.

Figure 6:
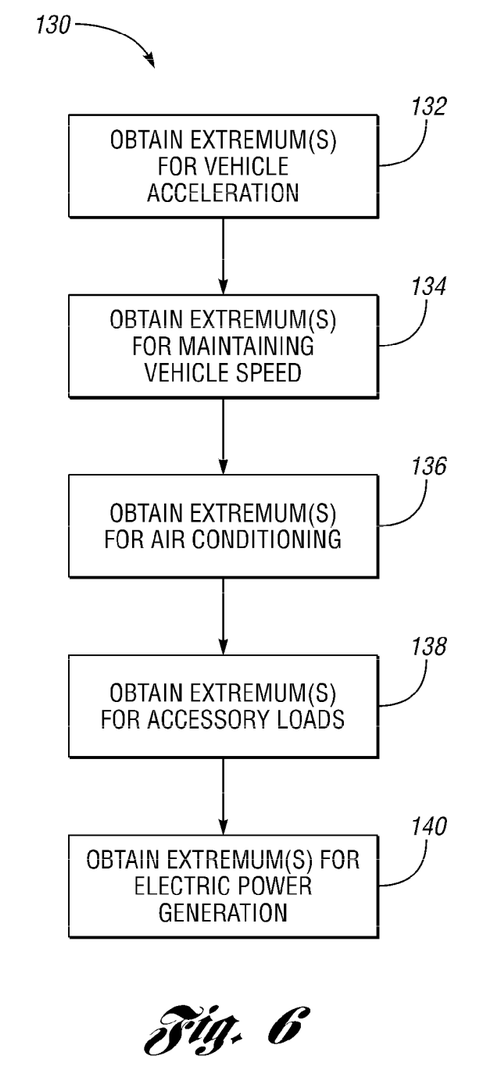
FIG. 6 is a flowchart diagram illustrating a method of obtaining an extremum.

With reference to FIG. 6, flowchart diagram 130 illustrates steps of a method of obtaining one or more energy usage extremum. The method of obtaining energy usage extremum may be used in step 108 of flowchart diagram 100.

At step 132 of flowchart diagram 130, an extremum indicating the maximum or minimum energy usage to accelerate the vehicle is obtained based on the given operating mode of the vehicle. The controller 14 obtains the extremum for vehicle acceleration based on the given operating mode of the vehicle.

At step 134, an extremum indicating the maximum or minimum energy usage to maintain the speed of the vehicle is obtained based on the given operating mode of the vehicle. The controller 14 obtains the extremum for maintaining vehicle speed based on the given operating mode of the vehicle.

At step 136, an extremum indicating the maximum or minimum energy usage to provide air conditioning in the vehicle is obtained based on the given operating mode of the vehicle. The controller 14 obtains the extremum for maintaining vehicle speed based on the given operating mode of the vehicle.

At step 138, an extremum indicating the maximum or minimum energy usage to supply accessory loads in the vehicle is obtained based on the given operating mode of the vehicle. The controller 14 obtains the extremum for accessory loads based on the given operating mode of the vehicle.

At step 140, an extremum indicating the maximum or minimum energy generation from decelerating the vehicle is obtained based on the given operating mode of the vehicle. The controller 14 obtains the extremum for electric power generation based on the given operating mode of the vehicle. Regenerative braking of the vehicle can be used to generate electric energy for the vehicle.

With continuing reference to FIG. 6, the controller 14 may access memory 12 to lookup at least one of the extremum obtained in steps 132, 134, 136, 138, and 140 of flowchart diagram 130. Alternatively, the controller 14 may calculate at least one of the extremum obtained in steps 132, 134, 136, 138, and 140 based on the energy usage amounts obtained and the given driving mode of the vehicle.

Figure 7:
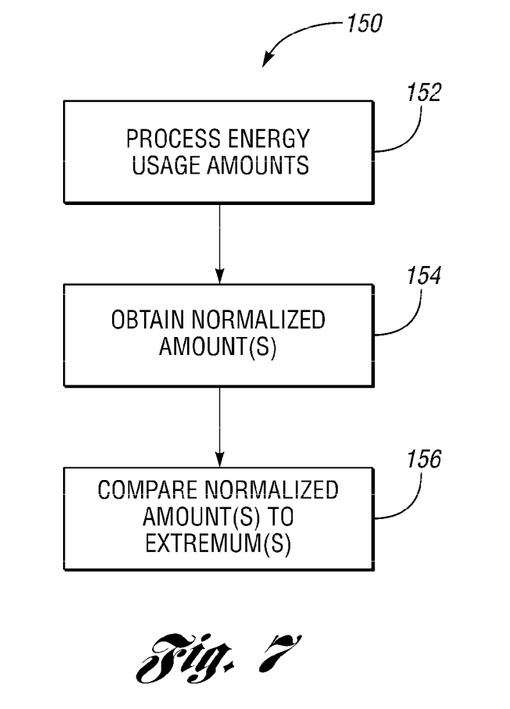
FIG. 7 is a flowchart diagram illustrating a method of determining an efficiency level.

With reference to FIG. 7, flowchart diagram 150 illustrates steps of a method of determining at least one efficiency level. The method of determining at least one efficiency level may be used in step 110 of flowchart diagram 100.

At step 152, energy usage amounts are processed. The controller 14 can process the energy usage amounts concurrently or in any suitable sequence. In addition, the controller 14 may process the energy usage amounts periodically, such as every 50 milliseconds to 60 seconds, depending on the configuration of the system 10.

At step 154, a normalized amount is obtained. The normalized amount represents a sum of the energy usage amounts relating to the given operating mode of the vehicle. For example, the normalized amount may represent the sum of energy used to accelerate the vehicle, energy used to maintain a speed of the vehicle, energy used to provide air conditioning, energy used to supply accessory loads, energy generated from decelerating the vehicle, or a combination thereof. The controller 14 can obtain the normalized amount after performing step 152 or from another operation of the controller 14.

At step 156, the efficiency level may be determined based on the normalized amount and the extremum obtained in step 108. The controller 14 can compare the normalized amount to the extremum to obtain the efficiency level of energy usage. The predetermined extremum may be either a maximum or a minimum level of energy that can be used to achieve the given operating mode of the vehicle.

Although the various steps shown in flowchart diagrams 118, 130, and 150 appear to occur in a chronological sequence, at least some of the steps may occur in a different order, and some steps may be performed concurrently or not at all. In addition, the method of obtaining energy usage amounts (FIG. 5), the method of obtaining energy usage extremum (FIG. 6), the method of determining at least one efficiency level (FIG. 7), or a combination thereof may be implemented through a computer algorithm, machine executable code, or a software program programmed into a suitable programmable logic device(s) of the vehicle, such as the controller 14 or other controller in the vehicle.

The system and method for indicating the efficiency level of energy usage by the vehicle to a passenger provides a number of benefits, including benefits that are not mentioned herein. One benefit may include informing the passenger of the efficiency of energy usage by the vehicle using the ambient light as well as providing a graphical representation of the efficiency level. One or more characteristics of the ambient light indicate the efficiency level. Thus, the passenger can view the ambient light and, based on the characteristics of the ambient light, the passenger can be informed of the efficiency level. The ambient light allows the passenger to be informed of the efficiency level without the passenger taking his or her eyes off the road. Furthermore, the graphical representation of the efficiency level can inform the passenger of what is influencing or affecting the efficiency level of energy usage. Based on the graphical representation, the passenger can control one or more operations in the vehicle to change at least one of the active energy amounts while maintaining the given operating mode of the vehicle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for indicating to a passenger an efficiency level of energy usage by an automotive vehicle with a passenger compartment, the system comprising:
   a computer-readable storage medium;
   a controller in communication with the storage medium, the controller being configured to receive a plurality of energy usage signals, to process the energy usage signals to obtain indications of energy usage amounts that the passenger can control while maintaining a given operating mode of the automotive vehicle, and to determine the efficiency level of energy usage by the automotive vehicle based on the energy usage amounts for the given operating mode of the automotive vehicle;
   an interior-lighting system in electrical communication with the controller to illuminate at least a portion of the passenger compartment with ambient light having defined characteristics including a luminance and a color, at least one of the characteristics of the ambient light indicating the efficiency level; and
   a display unit in electrical communication with the controller to display for the passenger a graphical representation of the efficiency level of the automotive vehicle.

2. The system of claim 1 wherein at least one of the characteristics of the ambient light allows the passenger to be informed of the efficiency level as the passenger focuses on controlling the automotive vehicle from one location to another, the display unit allowing the passenger to view the graphical representation once the passenger has been informed of the efficiency level indicated by at least one of the characteristics of the ambient light.

3. The system of claim 1 wherein the efficiency level represents a relationship of minimal amount of energy usage needed to establish the given operating mode and the energy usage amounts expended to establish the given operating mode.

4. The system of claim 1 wherein the display unit displays a graphical representation of at least one of the energy usage amounts relative to a graphical measure to display the graphical representation of the efficiency level.

5. The system of claim 1 wherein the controller is further configured to process the energy usage amounts to obtain a normalized amount, the normalized amount representing a sum of the energy usage amounts relating to the given operating mode of the automotive vehicle, and to compare the normalized amount to a predetermined extremum to obtain the efficiency level.

6. The system of claim 5 wherein the display unit displays a graphical representation of at least one of the energy usage amounts relative to a graphical measure indicating the predetermined extremum to display the graphical representation of the efficiency level, the display unit allowing the passenger to view the graphical representation of the efficiency level to reduce the normalized amount while maintaining the given operating mode of the automotive vehicle.

7. The system of claim 1 wherein the energy usage amounts represent at least one of energy used to accelerate the automotive vehicle, energy used to maintain a speed of the automotive vehicle, energy used to provide air conditioning in the automotive vehicle, energy used to supply accessory loads in the automotive vehicle, and electric energy generated from decelerating the automotive vehicle.

8. The system of claim 1 wherein the controller is configured to control one or more operations in the automotive vehicle to change at least one of the energy usage amounts while maintaining the given operating mode of the automotive vehicle.

9. The system of claim 1 wherein the interior-lighting system includes at least one of a door light, a ceiling light, a foot-well light, an instrument panel light, a beverage-holder light, a knob light, a button light, and a trim light.

10. The system of claim 1 wherein the controller is configured to control at least one of the luminance and the color of the ambient light based on the efficiency level.

11. The system of claim 10 wherein the controller changes the color of the ambient light from a color representing conservative energy usage to a color representing aggressive energy usage when the controller determines that the efficiency level is below a predetermined level of efficiency.

12. The system of claim 10 wherein the controller changes at least one of the luminance and the color of the ambient light based on one of the energy usage amounts representing energy used to accelerate the automotive vehicle.

13. The system of claim 10 wherein the controller changes at least one of the luminance and the color of the ambient light based on one of the energy usage amounts representing energy used to maintain a speed of the automotive vehicle.

14. The system of claim 10 wherein the controller changes at least one of the luminance and the color of the ambient light based on one of the energy usage amounts representing energy used to provide air conditioning in the automotive vehicle.

15. The system of claim 10 wherein the controller changes at least one of the luminance and the color of the ambient light based on one of the energy usage amounts representing electric energy generated from decelerating the automotive vehicle.

16. A method for controlling a vehicle lighting system comprising:
receiving input indicative of energy usage;
generating an efficiency level based on the energy usage for a given operating mode of a vehicle;
controlling illumination of a portion of a vehicle passenger compartment with ambient light based on the efficiency level, the ambient light having defined characteristics including a luminance and a color; and
displaying a graphical representation of at least one of the energy usage amounts relative to a graphical measure to display the graphical representation of the efficiency level, wherein changing the one energy usage amount changes the graphical representation of the energy usage amount relative to the graphical measure.

17. The method of claim 16 further comprising:
processing the energy usage amounts to obtain a normalized amount, the normalized amount representing a sum of the energy usage amounts relating to the given operating mode of the automotive vehicle, and comparing the normalized amount to a predetermined extremum to obtain the efficiency level.

18. The method of claim 16 further comprising:
controlling at least one of the luminance and the color of the ambient light based on the efficiency level.

19. A system for indicating to a passenger an efficiency level of energy usage by an automotive vehicle with a passenger compartment, the system comprising:
a computer-readable storage medium;
a controller in communication with the storage medium, the controller being configured to receive a plurality of energy usage signals and to process the energy usage signals to obtain indications of energy usage amounts that the passenger can control to accelerate the automotive vehicle, to maintain a speed of the automotive vehicle, to provide air conditioning in the automotive vehicle, to supply accessory loads in the automotive vehicle, and to generate electric energy from decelerating the automotive vehicle while maintaining a given operating mode of the automotive vehicle, the controller further being configured to process the energy usage amounts to obtain a normalized amount representing a sum of the energy usage amounts relating to the given operating mode of the vehicle and to compare the normalized amount to a predetermined extremum to obtain the efficiency level of energy usage by the automotive vehicle;
an interior-lighting system in electrical communication with the controller to illuminate at least a portion of the passenger compartment with ambient light having defined characteristics including a luminance and a color, at least one of the characteristics of the ambient light indicating the efficiency level; and
a display unit in electrical communication with the controller to display a graphical representation of the efficiency level for the passenger, the graphical representation including a graphical representation of the normalized amount relative to a graphical measure indicating the predetermined extremum for the passenger;
wherein the controller is configured to control at least one of the luminance and the color of the ambient light based on the efficiency level.

20. A vehicle system comprising:
a lighting system configured to illuminate a portion of a vehicle with ambient light having a luminance and a color; and
a controller configured to:
receive input indicative of energy usage by the vehicle,
generate an efficiency level based on the energy usage for a given operating mode, and
control the luminance and the color of the ambient light based on the efficiency level; and
a display unit configured to display a graphical representation of at least one of the energy usage amounts relative to a graphical measure to display the graphical representation of the efficiency level, wherein changing the one energy usage amount changes the graphical representation of the energy usage amount relative to the graphical measure.

* * * * *